US 12,038,046 B2

United States Patent
Ando et al.

(10) Patent No.: US 12,038,046 B2
(45) Date of Patent: Jul. 16, 2024

(54) ROLLING GUIDE DEVICE

(71) Applicant: THK CO., LTD., Tokyo (JP)

(72) Inventors: Yoshihiro Ando, Tokyo (JP); Hitoshi Aoyagi, Tokyo (JP); Yuki Toba, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/288,048

(22) PCT Filed: Mar. 31, 2022

(86) PCT No.: PCT/JP2022/016474
§ 371 (c)(1),
(2) Date: Oct. 24, 2023

(87) PCT Pub. No.: WO2022/239569
PCT Pub. Date: Nov. 17, 2022

(65) Prior Publication Data
US 2024/0084849 A1 Mar. 14, 2024

(30) Foreign Application Priority Data
May 13, 2021 (JP) .................................. 2021-081449

(51) Int. Cl.
*F16C 29/08* (2006.01)
*F16C 29/04* (2006.01)
*F16C 29/06* (2006.01)

(52) U.S. Cl.
CPC ............ *F16C 29/084* (2013.01); *F16C 29/04* (2013.01); *F16C 29/063* (2013.01)

(58) Field of Classification Search
CPC ...... F16C 29/04; F16C 29/045; F16C 29/063; F16C 29/084; F16C 29/086; F16C 29/123; F16C 29/0633–0678
See application file for complete search history.

(56) References Cited

U.S. PATENT DOCUMENTS 2,951,728 A * 9/1960 Drake ................... F16C 29/084
384/15
5,109,720 A 5/1992 Kasuga
(Continued)

FOREIGN PATENT DOCUMENTS

DE 10243021 A1 3/2004
DE 102017128519 A1 5/2019
(Continued)

OTHER PUBLICATIONS

International Search Report dated Jun. 21, 2022, issued in counterpart International Application No. PCT/JP2022/016474, with English Translation. (4 pages).
(Continued)

*Primary Examiner* — Alan B Waits
(74) *Attorney, Agent, or Firm* — WHDA, LLP (57) ABSTRACT

A rolling guide device includes a track member, a moving member, and a plurality of rolling bodies. Rolling-body rolling surfaces that come into contact with an rolling-body outer circumferential surface of a rolling body are respectively formed in wall surfaces of a pair of wall portions included in the track member facing each other, a scraper including a pressing portion that presses the rolling-body rolling surfaces is turnably installed in the moving member, the scraper includes at least an attachment portion and a pressing portion, and is formed such that a frictional force of the pressing portion with respect to the rolling-body rolling surfaces is smaller than a frictional force of the attachment portion with respect to an attachment shaft formed in the moving member.

7 Claims, 8 Drawing Sheets

(56) References Cited

U.S. PATENT DOCUMENTS 5,624,195 A * 4/1997 Abe .................. F16C 29/084
                                                          384/15
2003/0081866 A1    5/2003 Schmidt

FOREIGN PATENT DOCUMENTS

| | | |
|---|---|---|
| JP | 2-116056 U | 9/1990 |
| JP | 5-58946 U | 8/1993 |
| JP | 2001-263350 A | 9/2001 |
| JP | 3292459 B2 | 6/2002 |
| JP | 2010-121723 A | 6/2010 |
| JP | 2017-133636 A | 8/2017 |
| WO | 2008/041695 A1 | 4/2008 |

OTHER PUBLICATIONS

Decision to Grant a Patent dated Oct. 4, 2022, issued in counterpart of Japanese Patent Application No. 2021-081449, with English Translation (5 pages).

Office Action dated Jan. 20, 2024, issued in counterpart CN Application No. 202280027180.5, with English translation. (13 pages).

* cited by examiner

ROLLING GUIDE DEVICE

TECHNICAL FIELD

The present invention relates to a rolling guide device.

BACKGROUND ART

Hitherto, a rolling guide device configured to include a track member that has a substantially C-like cross-section that extends in the longitudinal direction, a moving member installed to be movable in a reciprocal manner along the longitudinal direction of the track member, and a plurality of rolling bodies that guide the relative reciprocal movement of the moving member with respect to the track member by being rollably disposed in a substantially C-like inner space configuring the track member and between the track member and the moving member has been publicly known.

As a specific example of a rolling guide device of this type, a linear bearing disclosed in Patent Literature 1 described below exists, for example. This linear bearing has the following configuration. Two left and right straight rails each having a C-like shape in cross-section are parallelly provided to face each other. Two inner tracks facing each other on the upper and lower sides are formed in each rail. A slider having three or more rollers alternately coming into contact with those upper and lower inner tracks is provided. The outline of an outer circumferential surface of each roller is formed such that the cross-section is an arc shape having a radius r. One of the upper and lower inner tracks has a V-like cross-sectional shape, and the other inner track is formed such that a cross-section is an arc shape having a radius R. The length of the radius R is formed to be longer than the radius r of the outline of the roller. As a result of the configuration as above, in the linear bearing disclosed in Patent Literature 1 described below, the slider is able to smoothly move even when the rails are deformed and the left side and the right side are not in parallel with each other due to load and expansion caused by heat.

Meanwhile, when the rolling guide device of this type is to be stably used in every environment, it can be conceived to install a scraper in the moving member such as the slider in order to prevent dust and the like from the outside that inhibit the rolling operation of a rolling body such as the roller from intruding into the track member such as a track rail and prevent lubricant such as grease supplied to the rolling body from leaking to the outside.

CITATION LIST

Patent Literature

Patent Literature 1: Japanese Patent No. 3292459

SUMMARY OF INVENTION

Problems to be Solved by the Invention

However, when a scraper is simply installed in the slider disclosed in Patent Literature 1 described above, a problem occurs. In other words, when the scraper is fixed to the slider configuring the linear bearing in Patent Literature 1, the following problem occurs. Specifically, when the slider is tilted with respect to the straight rail in the rolling direction, the contact force between the inner tracks of the straight rail and the scraper is distorted. Therefore, a gap is generated, the function of the scraper cannot be exhibited, and a stable reciprocal linear movement of the slider with respect to the straight rail is inhibited.

The present invention has been made in view of the problem existing in the related art described above, and an object thereof is to provide a rolling guide device capable of exhibiting a function of a scraper without inhibiting a reciprocal linear movement of a moving member with respect to a track member even when the moving member is tilted with respect to the track member in a rolling direction.

Means for Solving the Problems

A rolling guide device according to the present invention is a rolling guide device including: a track member that is a long member extending in a longitudinal direction, the track member being formed by: an attachment surface portion serving as an attachment reference with respect to an external member; and a pair of wall portions installed upright toward one side from each of both ends of the attachment surface portion; a moving member installed to be movable in a reciprocal manner along the longitudinal direction of the track member; and a plurality of rolling bodies that guide a relative reciprocal movement of the moving member with respect to the track member by being rollably disposed in a space surrounded by the attachment surface portion and the pair of wall portions forming the track member and between the track member and the moving member. In the rolling guide device, a rolling-body rolling surface that comes into contact with a rolling-body outer circumferential surface of each of the rolling bodies is formed in each of wall surfaces of the pair of wall portions facing each other, a scraper including a pressing portion that presses the rolling-body rolling surface is turnably installed in the moving member, the scraper includes at least: an attachment portion turnably attached to an attachment shaft formed in the moving member; and the pressing portion that presses the rolling-body rolling surface, and a frictional force of the pressing portion with respect to the rolling-body rolling surface is smaller than a frictional force of the attachment portion with respect to the attachment shaft formed in the moving member.

Effects of the Invention

According to the present invention, it is possible to provide the rolling guide device capable of exhibiting the function of the scraper without inhibiting the reciprocal linear movement of the moving member with respect to the track member even when the moving member is tilted with respect to the track member in the rolling direction.

BRIEF DESCRIPTION OF THE DRAWINGS

FIG. 6 is a left side view for describing a scraper included in the rolling guide device according to the present embodiment in which FIG. 6(a) shows a state in which an Mc moment in the rolling direction is not applied to the moving slider, and FIG. 6(b) shows a state in which the Mc moment in the rolling direction is applied to the moving slider.

MODE FOR CARRYING OUT THE INVENTION

Figure 1:
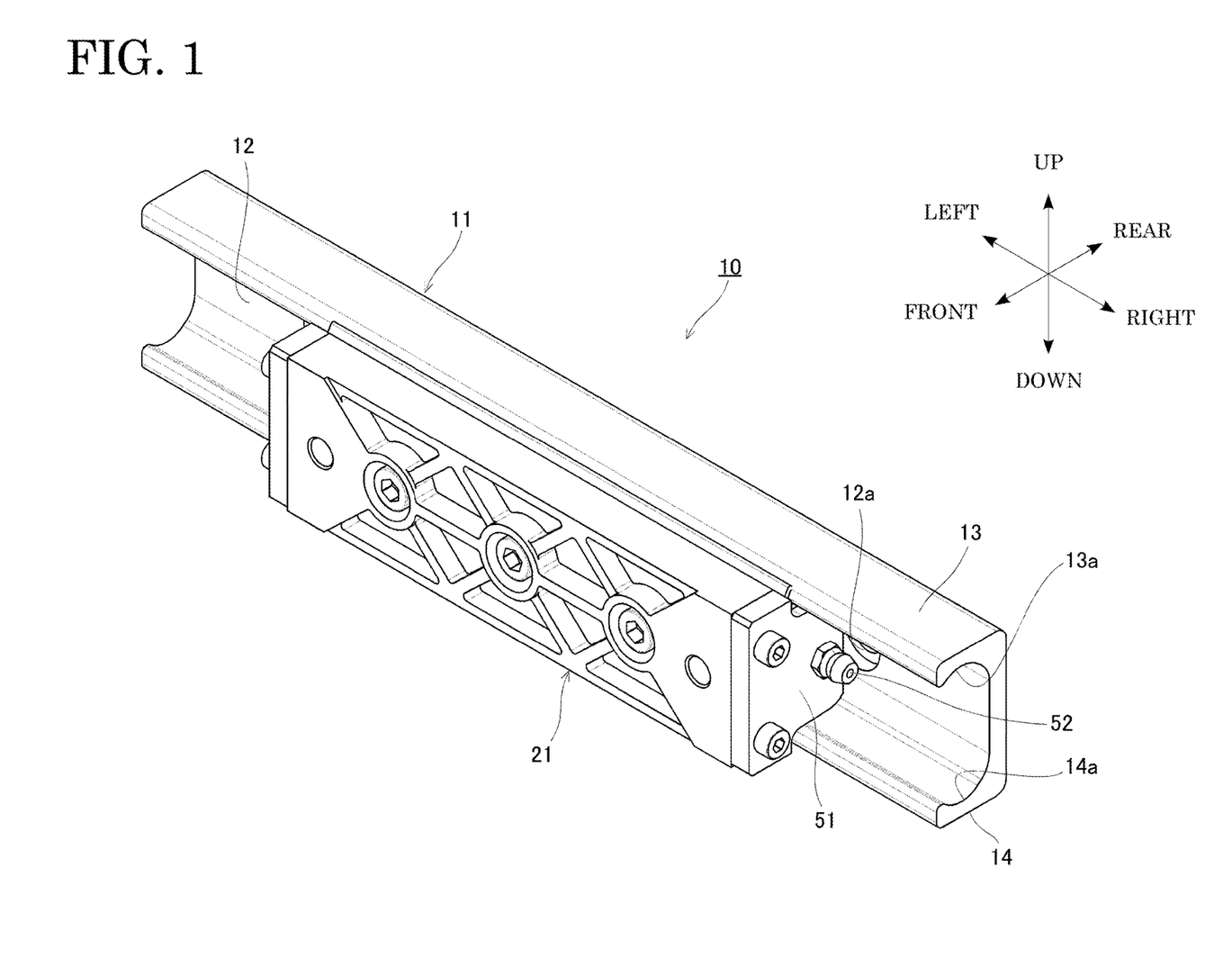
FIG. 1 is a perspective view of a rolling guide device according to the present embodiment viewed diagonally from the front right side above.
Figure 2:
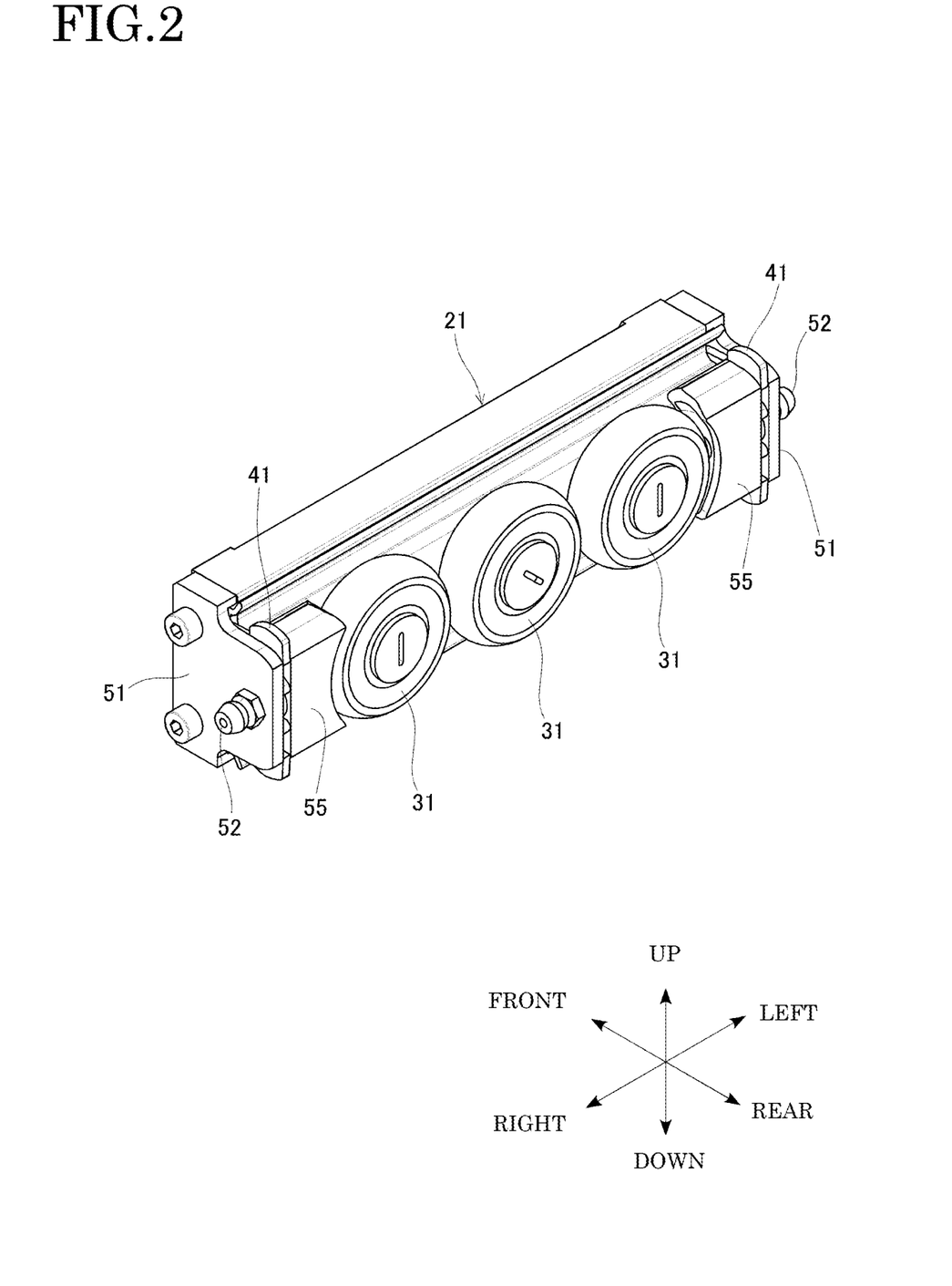
FIG. 2 is a perspective view of a moving slider configuring the rolling guide device according to the present embodiment viewed diagonally from the rear right side above.
Figure 3:
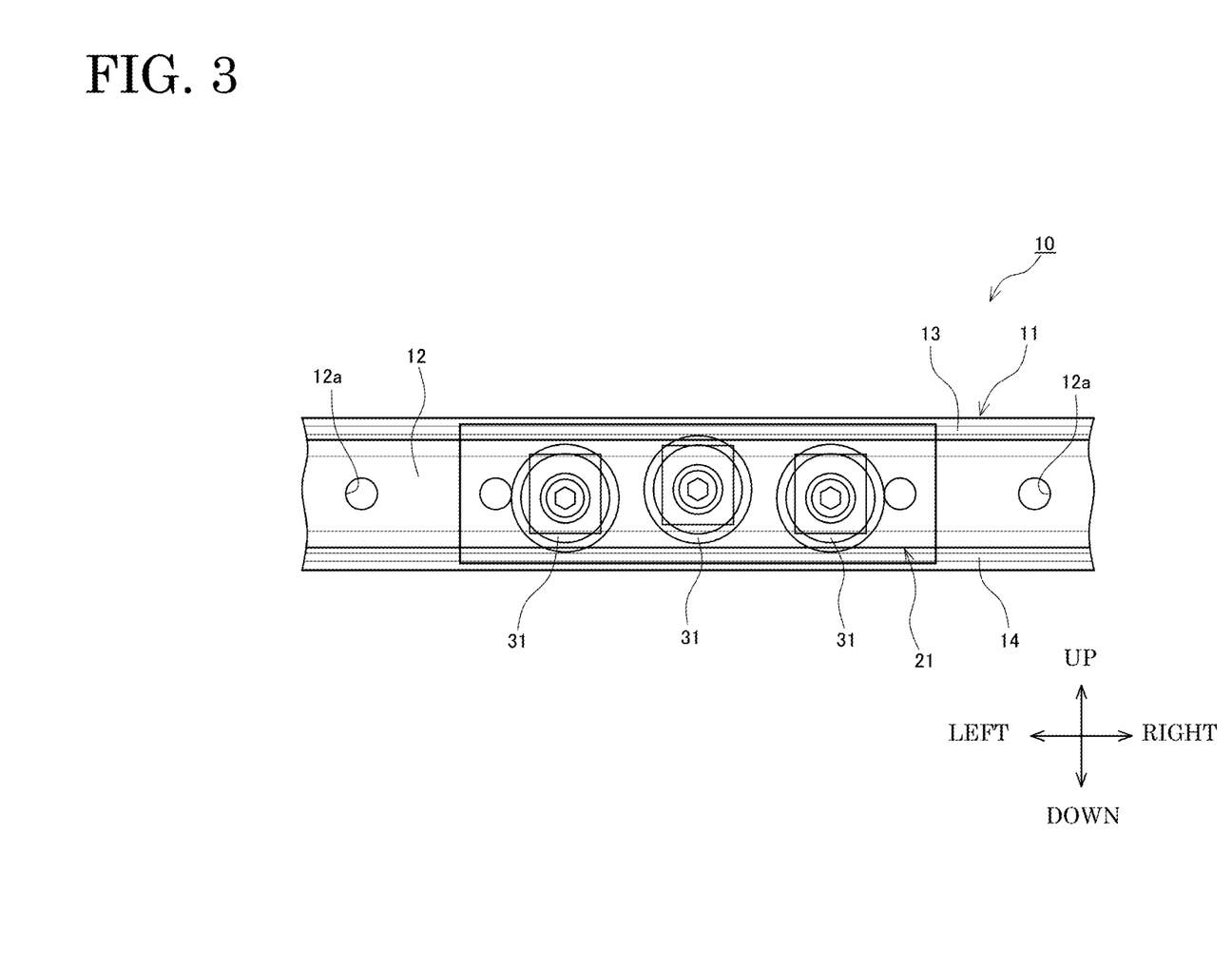
FIG. 3 is a transparent view of the rolling guide device according to the present embodiment viewed from the front-surface side.
Figure 4:
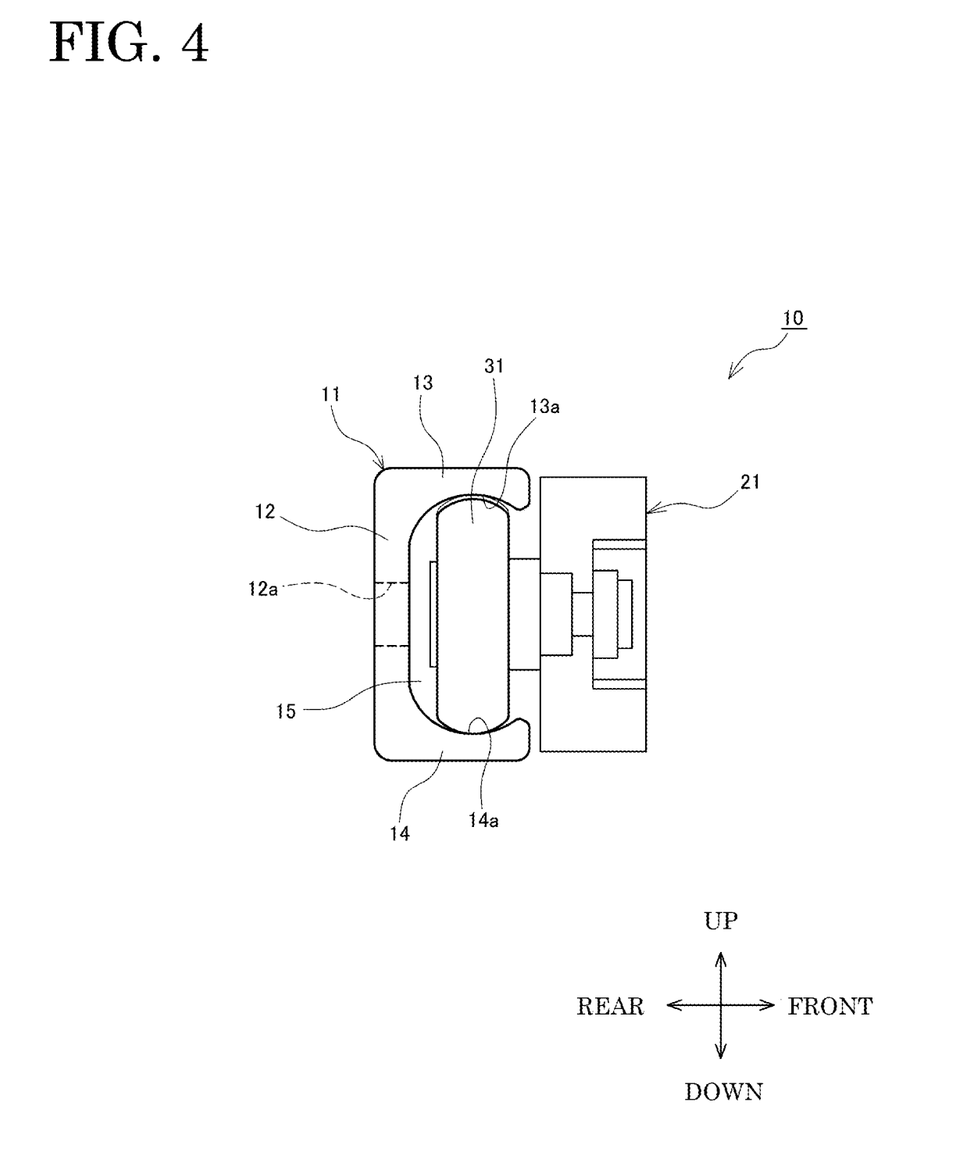
FIG. 4 is a transparent view of the rolling guide device according to the present embodiment viewed from the left-side-surface side.
Figure 5:
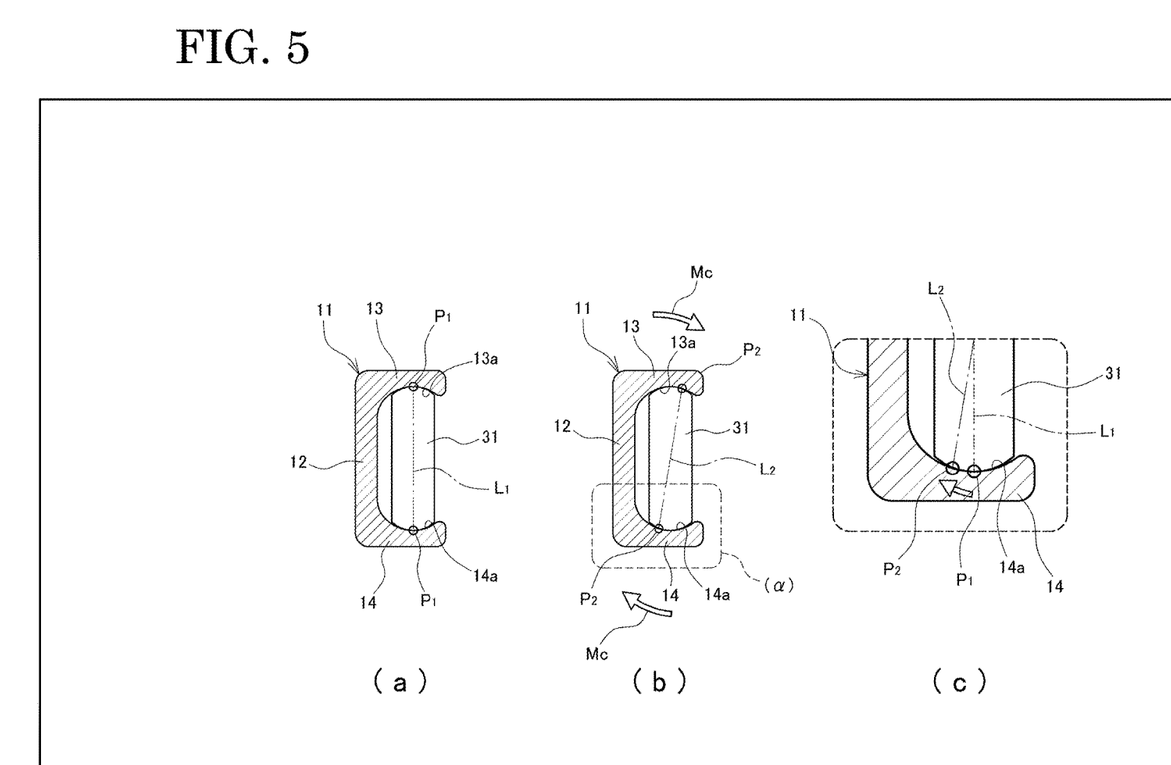
FIG. 5 is a schematic view for describing a rolling operation state of a wheel with respect to a wheel upper-side rolling surface and a wheel lower-side rolling surface in the present embodiment.

A suitable embodiment for carrying out the present invention is described below with reference to the drawings. The embodiment described below does not limit the invention according to each claim, and not all of the combinations of the features described in the embodiment are essential for the solving means of the invention First, a basic configuration of a rolling guide device 10 according to the present embodiment is described with reference to FIG. 1 to FIG. 5. FIG. 1 is a perspective view of the rolling guide device according to the present embodiment viewed diagonally from the front right side above, and FIG. 2 is a perspective view of a moving slider configuring the rolling guide device according to the present embodiment viewed diagonally from the rear right side above. FIG. 3 is a transparent view of the rolling guide device according to the present embodiment viewed from the front-surface side, and FIG. 4 is a transparent view of the rolling guide device according to the present embodiment viewed from the left-side-surface side. FIG. 5 is a schematic view for describing a rolling operation state of a wheel with respect to a wheel upper-side rolling surface and a wheel lower-side rolling surface in the present embodiment. In FIG. 5, FIG. 5(a) shows a state in which the Mc moment in the rolling direction is not applied to a moving slider 21, FIG. 5(b) shows a state in which the Mc moment in the rolling direction is applied to the moving slider 21, and FIG. 5(c) is a view in which a broken-line region indicated by a character a in FIG. 5(b) is enlarged. In the present specification, the directions of the rolling guide device 10 are defined as shown in FIG. 1 to FIG. 4 for explanatory convenience. However, those directions do not indicate the directions at the time of usage of the rolling guide device 10 according to the present embodiment, and the rolling guide device 10 according to the present embodiment can be used in every posture. In other words, the directions of "front, rear, up, down, left, right" shown in FIG. 1 to FIG. 4 are specified for explanatory convenience only.

As shown in FIG. 1 to FIG. 4, the rolling guide device 10 according to the present embodiment is configured by having a track rail 11 serving as a track member, the moving slider 21 serving as a moving member installed to be movable in a reciprocal manner along the longitudinal direction (in other words, the left and right directions in FIG. 1 to FIG. 3) of the track rail 11, and wheels 31 serving as rolling bodies disposed in a rollable state between the track rail 11 and the moving slider 21.

The track rail 11 is a long member that has a substantially C-like shape in cross-section and extends in the longitudinal direction. As shown in FIG. 4, the track rail 11 of the present embodiment has an attachment surface portion 12 formed to extend in the up-down direction, an upper wall portion 13 serving as a wall portion according to the present invention formed to extend from an upper end of the attachment surface portion 12 to the front side, and a lower wall portion 14 serving as a wall portion according to the present invention formed to extend from a lower end of the attachment surface portion 12 to the front side in side view.

A wheel upper-side rolling surface 13a serving as a rolling-body rolling surface according to the present invention that comes into contact with wheel outer circumferential surfaces of the wheels 31 are formed on the lower surface side of the upper wall portion 13. Similarly, a wheel lower-side rolling surface 14a serving as a rolling-body rolling surface according to the present invention that comes into contact with the wheel outer circumferential surfaces of the wheels 31 are formed on the upper surface side of the lower wall portion 14. The wheel upper-side rolling surface 13a and the wheel lower-side rolling surface 14a are disposed to face each other in side view. The wheels 31 are disposed in an inner space 15 (the inside of a space according to the present invention) surrounded by the attachment surface portion 12, the upper wall portion 13, and the lower wall portion 14 in a rollable state.

The external shape of the track rail 11 of the present embodiment described above is formed by plastically deforming a metal material by a drawing process. However, the method of forming the track rail 11 is not limited to the drawing process. For example, the appearance shape may be formed by performing a grinding process, a cutting process, and the like on a metal material, or the external shape may be formed by performing a grinding process and the like while controlling surface hardness and internal quality by performing a heat treatment process after plastically deforming the metal material by a drawing process. In other words, the external shape of the track rail 11 that is a track member of the present invention can be formed with use of any processing method.

The track rail 11 of the present embodiment is a member serving as an attachment reference of the rolling guide device 10. Therefore, in the present embodiment, attachment holes 12a such as bolt holes are formed in the attachment surface portion 12 configuring the track rail 11. As a result, fixing and installation of the track rail 11 with respect to an attachment reference surface of a base, a door frame, or the like can be performed with use of the attachment holes 12a.

As shown in FIG. 1 and FIG. 2, the moving slider 21 is a block-like member having a substantially rectangular shape and is installed to be movable in a reciprocal manner along the longitudinal direction of the track rail 11. In the moving slider 21 of the present embodiment, three wheels 31 are disposed on the rear surface side in a rollable state. A movable member that is moved by being guided by the rolling guide device 10 can be installed on the front surface side of the moving slider 21. In the rolling guide device 10 according to the present embodiment, an embodiment example in which the track rail 11 is fixed and installed with respect to the attachment reference surface of the base, the door frame, or the like, and the moving slider 21 is installed to be movable in a reciprocal manner with respect to the track rail 11 has been shown. However, the scope of the present invention is not limited to the above. For example, the moving slider 21 may be fixed to the attachment reference surface, and the track rail 11 may be movable in a reciprocal manner with respect to the moving slider 21.

The wheels 31 are members that guide the relative reciprocal movement of the moving slider 21 with respect to the track rail 11 by being rollably disposed in the substantially C-like inner space 15 configuring the track rail 11 and between the track rail 11 and the moving slider 21.

More specifically, regarding the wheels 31 of the present embodiment, three wheels 31 are disposed on the rear surface side of the moving slider 21 in a rollable state. As it is clear by referring to FIG. 3 and FIG. 4 in comparison with each other, one wheel 31 positioned in the center out of the three wheels 31 is disposed to be in contact with the wheel upper-side rolling surface 13*a* and to not be in contact with the wheel lower-side rolling surface 14*a* by having a gap with respect to the wheel lower-side rolling surface 14*a*. Meanwhile, the two wheels 31 positioned on the left and right out of the three wheels 31 are disposed to be in contact with the wheel lower-side rolling surface 14*a* and to not be in contact with the wheel upper-side rolling surface 13*a* by having a gap with respect to the wheel upper-side rolling surface 13*a*. The following occurs by disposing the three wheels 31 such that the positions thereof are staggered in the up-down direction in front view as above. For example, when the moving slider 21 moves to the right side of the plane of the paper with respect to the track rail 11 in FIG. 3, the one wheel 31 positioned in the center rotates in a counterclockwise manner with respect to the plane of the paper of FIG. 3, and the two wheels 31 positioned on the left and right rotate in a clockwise manner with respect to the plane of the paper of FIG. 3. Conversely, when the moving slider 21 moves to the left side of the plane of the paper with respect to the track rail 11 in FIG. 3, the one wheel 31 positioned in the center rotates in a clockwise manner with respect to the plane of the paper of FIG. 3, and the two wheels 31 positioned on the left and right rotate in a counterclockwise manner with respect to the plane of the paper of FIG. 3. As above, by disposing the three wheels 31 to be staggered with each other in the up-down direction in front view, the moving slider 21 that performs a relative linear movement along the longitudinal direction of the track rail 11 can perform a suitable reciprocal linear movement while suitably receiving a moment load.

In the present embodiment shown in FIG. 1 to FIG. 4, a configuration example in which the one wheel 31 positioned in the center is disposed to be in contact with the wheel upper-side rolling surface 13*a* and the two wheels 31 positioned on the left and right are disposed to be in contact with the wheel lower-side rolling surface 14*a* has been shown. However, the scope of the present invention is not limited to the above. For example, a configuration disposed to be opposite from the present embodiment, that is, a configuration in which the one wheel 31 positioned in the center is disposed to be in contact with the wheel lower-side rolling surface 14*a* and the two wheels 31 positioned on the left and right are disposed to be in contact with the wheel upper-side rolling surface 13*a* may be employed.

In the present invention, a configuration example in which four or more wheels 31 are disposed with respect to the rear surface side of the moving slider 21 is also possible. In the case of this configuration example, it is preferred adjacent wheels 31 be disposed to come into contact with the wheel upper-side rolling surface 13*a* and the wheel lower-side rolling surface 14*a* in a staggered manner.

The wheel in the present invention is a wheel member that is attached to a rotational shaft in a rotatable state. A rolling contact surface of the wheel member with respect to a counterpart member is configured by any of a horizontal surface, a convex curved surface, and a concave curved surface. In the present embodiment, a case where the rolling contact surfaces of the wheels 31 are formed as convex curved surfaces is exemplified (see FIG. 4).

In the rolling guide device 10 according to the present embodiment, it is preferred that a rotational shaft of the wheel 31 be an eccentric shaft so that the position adjustment of the wheels 31 can be performed by rotating the eccentric shaft. For example, as shown in FIG. 3, in the present embodiment, the three wheels 31 are disposed side by side in the left-right direction. By causing rotational shafts of the two wheels 31 disposed on the left and right to be fixed shafts and a rotational shaft of the one wheel 31 disposed in the center to be an eccentric shaft, preload adjustment and the like of the three wheels 31 with respect to the track rail 11 can be performed by moving the position of the wheel 31 disposed in the center upward.

With reference to FIG. 5, the relationship between the wheels 31, the wheel upper-side rolling surface 13*a*, and the wheel lower-side rolling surface 14*a* is described. Although illustration is simplified in FIG. 5 because FIG. 5 is a schematic view, the following configuration is presupposed in the present embodiment. Out of the three wheels 31 described above, the one wheel 31 positioned in the center is disposed to be in contact with the wheel upper-side rolling surface 13*a* and to not be in contact with the wheel lower-side rolling surface 14*a* by having a gap with respect to the wheel lower-side rolling surface 14*a*. Meanwhile, out of the three wheels 31, the two wheels 31 positioned on the left and right are disposed to be in contact with the wheel lower-side rolling surface 14*a* and to not be in contact with the wheel upper-side rolling surface 13*a* by having a gap with respect to the wheel upper-side rolling surface 13*a*. In other words, in the description relating to FIG. 5 below, it is shown that the wheel that is in contact with the wheel upper-side rolling surface 13*a* is the one wheel 31 positioned in the center, and the wheels that are in contact with the wheel lower-side rolling surface 14*a* are the two wheels 31 positioned on the left and right.

In the present embodiment, the cross-sectional shapes of the wheel upper-side rolling surface 13*a* and the wheel lower-side rolling surface 14*a* are formed as circular-arc grooves each formed by a single arc. In other words, the curvature radius of the wheel upper-side rolling surface 13*a* and the wheel lower-side rolling surface 14*a* is formed to be slightly greater than the curvature radius of rolling front surfaces of the wheels 31. Therefore, each wheel 31 according to the present embodiment is in contact with each of the wheel upper-side rolling surface 13*a* and the wheel lower-side rolling surface 14*a* by one point.

As shown in FIG. 5(*a*) in FIG. 5, in the case of a state where an Mc moment in the rolling direction is not applied to the moving slider 21, a line $L_1$ indicating the rolling direction orthogonal to a rotation center line of the wheel 31 is a line disposed to be perpendicular in the up-down direction, and contact points $P_1$ between the wheel 31 and each of the wheel upper-side rolling surface 13*a* and the wheel lower-side rolling surface 14*a* are positioned in groove bottom centers of the circular-arc grooves configuring the wheel upper-side rolling surface 13*a* and the wheel lower-side rolling surface 14*a*.

When an Mc moment in the rolling direction is applied to the moving slider 21 from the state shown in FIG. 5(*a*) in FIG. 5, the wheel 31 is tilted in the direction in which the Mc moment is applied (the clockwise rotation direction with respect to the plane of the paper in FIG. 5(*b*)) as shown in FIG. 5(*b*) in FIG. 5. In other words, the line $L_1$ indicating the rolling direction orthogonal to the rotation center line of the wheel 31 is tilted to the position of a line L2. At this time, the cross-sectional shapes of the wheel upper-side rolling surface 13a and the wheel lower-side rolling surface 14a are formed as circular-arc grooves formed by a single arc, and hence the contact points move from the positions of the contact points $P_1$ to the positions of contact points P2 in accordance with the tilt of the wheel 31 in the clockwise rotation direction. In other words, in the rolling guide device 10 according to the present embodiment, even when an Mc moment in the rolling direction is applied to the moving slider 21, the contact points are displaced in accordance with the Mc moment, and the wheel 31 and each of the wheel upper-side rolling surface 13a and the wheel lower-side rolling surface 14a are constantly in contact with each other by one point. Therefore, a differential slip amount is small, and a satisfactory rolling movement is constantly realized.

Figure 6:
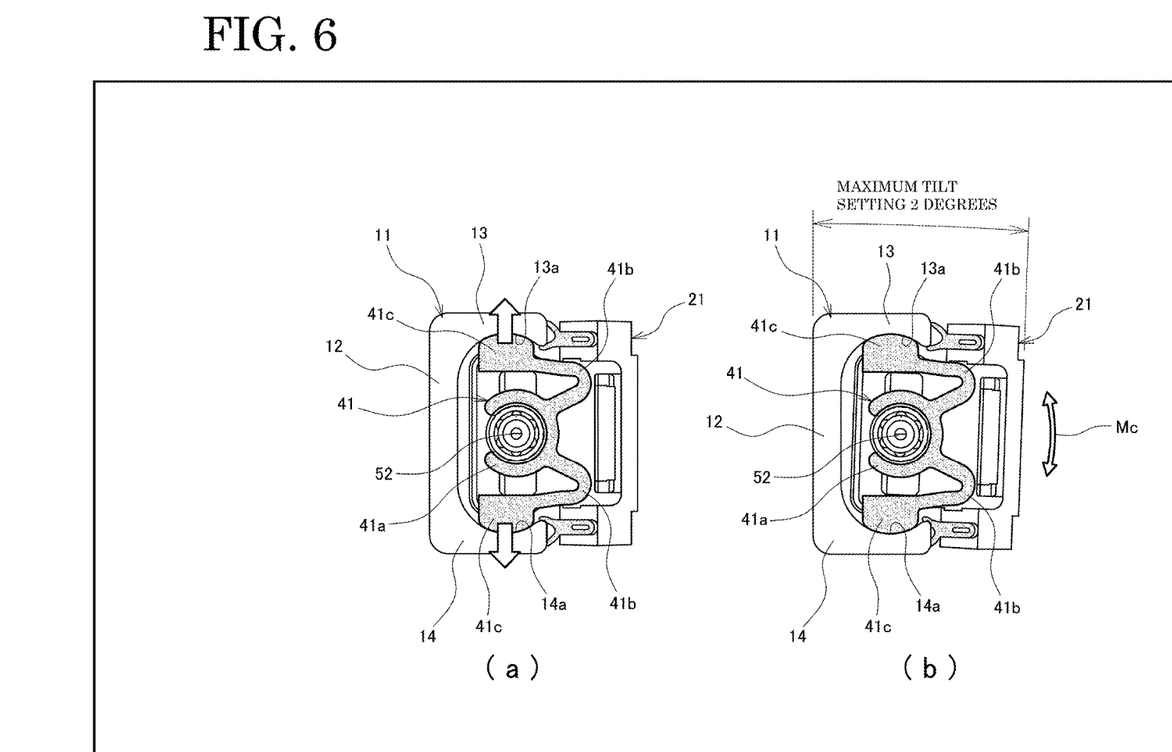
Figure 7:
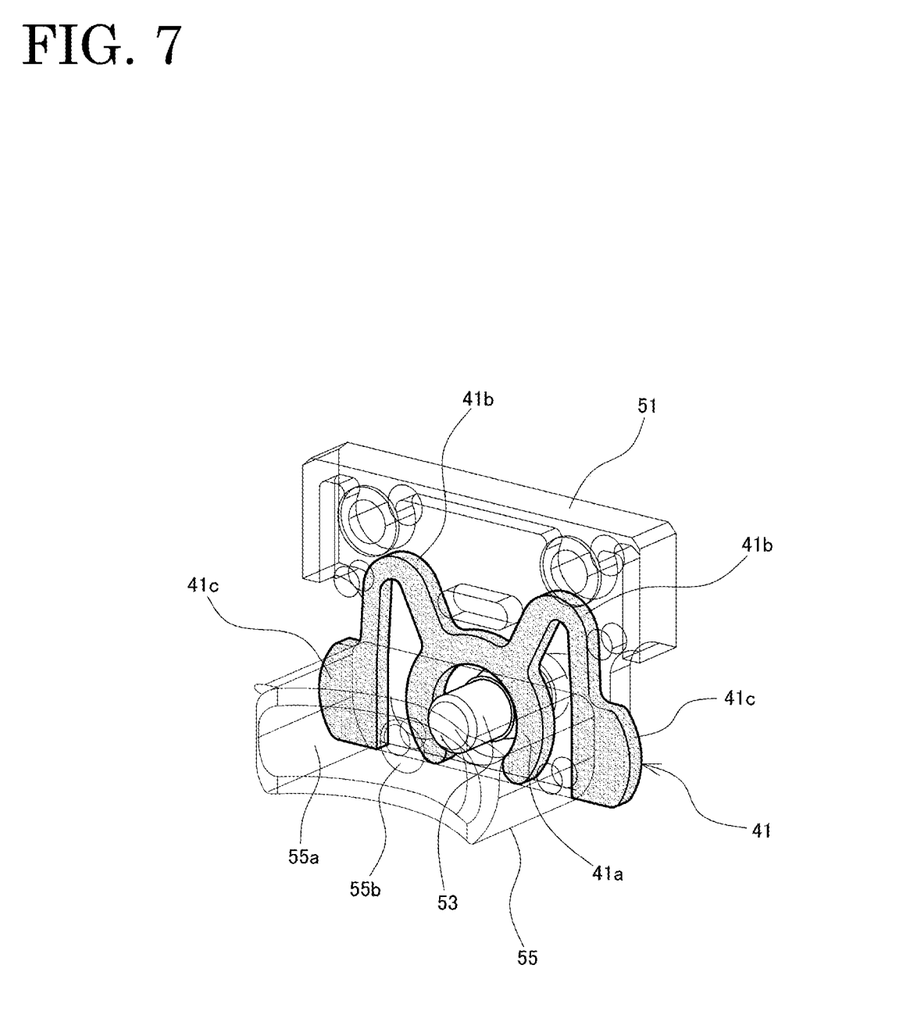
FIG. 7 is a main-part transparent view for describing an attachment state of the scraper included in the rolling guide device according to the present embodiment.

A basic configuration of the rolling guide device 10 according to the present embodiment has been described above. Next, a specific configuration of the rolling guide device 10 according to the present embodiment is described by adding FIG. 6 and FIG. 7 to the reference drawings. FIG. 6 is a left side view for describing a scraper included in the rolling guide device according to the present embodiment in which FIG. 6(a) shows a state in which an Mc moment in the rolling direction is not applied to the moving slider 21, and FIG. 6(b) shows a state in which the Mc moment in the rolling direction is applied to the moving slider 21. In FIG. 6, a state in which end plates 51 (see FIG. 2 and the like) installed on the outer side of scrapers 41 in the left-right direction are removed is shown for explanatory convenience. FIG. 7 is a main-part transparent view for describing an attachment state of the scraper included in the rolling guide device according to the present embodiment.

In the rolling guide device 10 according to the present embodiment, the end plate 51 installed on the outermost side, a grease supply member 55 that protects the outer side of the wheels 31, and the scraper 41 turnably installed in a position sandwiched between the end plate 51 and the grease supply member 55 are installed on each of end portions of the moving slider 21 in the left-right direction as shown in FIG. 2.

The end plate 51 is a plate-like member for fixing the scraper 41 and the grease supply member 55 and attaching the scraper 41 and the grease supply member 55 to the moving slider 21. As shown in FIG. 2, FIG. 7, and the like, a greasing nipple 52 is installed in a position in the center of each end plate 51, and lubricant such as grease can be injected to the wheels 31 from the outside by using the greasing nipple 52. As shown in FIG. 7, the inner side of the greasing nipple 52 is an attachment shaft 53 having an axial shape. An attachment portion 41a of the scraper 41 described below is installed on the attachment shaft 53 in a turnable state.

As shown in FIG. 7, the grease supply member 55 has a curved surface shape 55a in which the inner side has substantially the same curvature as an outer circumferential surface of the wheel 31. A greasing hole 55b is formed in the center of the curved surface shape 55a, and the greasing hole 55b functions as a greasing passage for supplying lubricant such as grease to the wheels 31 supplied from the greasing nipple 52 installed on the end plate 51.

The scraper 41 is disposed in a position sandwiched between the end plate 51 and the grease supply member 55. The scraper 41 according to the present embodiment is installed in a turnable state with respect to the moving slider 21.

When a specific configuration of the scraper 41 according to the present embodiment is described, the scraper 41 is configured to include the attachment portion 41a turnably attached to the attachment shaft 53 formed in the grease supply member 55 fixed to the moving slider 21, pressing portions 41c that press the wheel upper-side rolling surface 13a and the wheel lower-side rolling surface 14a, and connection portions 41b that connect the attachment portion 41a and the pressing portions 41c to each other while applying an elastic force between the attachment portion 41a and the pressing portions 41c as shown in FIG. 7. The scraper 41 according to the present embodiment is formed such that the entire appearance shape is a substantially M-like shape and the appearance shape of the attachment portion 41a is a substantially C-like shape. The scraper 41 of the present embodiment is formed such that the frictional force of the pressing portions 41c with respect to the wheel upper-side rolling surface 13a and the wheel lower-side rolling surface 14a becomes smaller than the frictional force of the attachment portion 41a with respect to the attachment shaft 53 formed in the moving slider 21. The scraper 41 of the present embodiment is formed by resin that is an elastic body having an elastic force. In the present embodiment, regarding the attachment shaft 53 to which the attachment portion 41a is attached in a turnable state, an embodiment example of the case where the attachment shaft 53 is formed in the grease supply member 55 is shown. However, the position in which the attachment shaft of the present invention is formed is not limited to the grease supply member 55, and the attachment shaft can be formed in a member configuring an end portion of the moving slider 21 such as the end plate 51.

As described above with reference to FIG. 5 and the like, in the rolling guide device 10 according to the present embodiment, even when an Mc moment in the rolling direction is applied to the moving slider 21, the contact points are displaced in accordance with the Mc moment, and the wheel 31 and each of the wheel upper-side rolling surface 13a and the wheel lower-side rolling surface 14a are constantly in contact with each other by one point. In this case, when the scraper 41 is tilted together in accordance with the tilting operation of the moving slider 21, gaps are generated in contact sections of the pressing portions 41c that press the wheel upper-side rolling surface 13a and the wheel lower-side rolling surface 14a, and the function as the scraper 41 for preventing the intrusion of dust and the like from the outside and preventing leakage of grease and the like on the inside cannot be sufficiently exhibited. However, in the scraper 41 of the present embodiment, the attachment portion 41a is turnably attached to the attachment shaft 53 formed in the end plate 51. Therefore, even when an Mc moment in the rolling direction is applied to the moving slider 21 and the moving slider 21 is tilted with respect to the track rail 11, the position and the posture of the scraper 41 with respect to the track rail 11 can be constantly maintained in the same state because the scraper 41 is turnably configured with respect to the moving slider 21.

The scraper 41 of the present embodiment is formed such that the frictional force of the pressing portions 41c with respect to the wheel upper-side rolling surface 13a and the wheel lower-side rolling surface 14a becomes smaller than the frictional force of the attachment portion 41a with respect to the attachment shaft 53 formed in the moving slider 21. Therefore, when the moving slider 21 is tilted with respect to the track rail 11, the pressing portions 41c in contact with the wheel upper-side rolling surface 13a and the wheel lower-side rolling surface 14a turn before the attachment portion 41a installed on the attachment shaft 53. However, the pressing portions 41c continue to abut against groove bottoms of the wheel upper-side rolling surface 13*a* and the wheel lower-side rolling surface 14*a*. Therefore, a suitable pressing force can be constantly applied to the wheel upper-side rolling surface 13*a* and the wheel lower-side rolling surface 14*a* regardless of the external force applied to the moving slider 21.

In the scraper 41 according to the present embodiment, the shapes of the wheel upper-side rolling surface 13*a* and the wheel lower-side rolling surface 14*a* and the shapes of the contact sections in the pressing portions 41*c* with respect to the wheel upper-side rolling surface 13*a* and the wheel lower-side rolling surface 14*a* are curved surface shapes having substantially the same curvature. As shown in FIG. 6, the shapes of the connection portions 41*b* configuring the scraper 41 are formed such that an elastic force applied in the direction in which the pressing portions 41*c* press the wheel upper-side rolling surface 13*a* and the wheel lower-side rolling surface 14*a* is constantly working. Therefore, the scraper 41 according to the present embodiment can constantly apply a suitable pressing force to the wheel upper-side rolling surface 13*a* and the wheel lower-side rolling surface 14*a* regardless of the external force with respect to the moving slider 21, and hence can exhibit the function as the scraper 41 for preventing intrusion of dust and the like from the outside and preventing leakage of grease and the like on the inside at all times.

As shown in FIG. 6, in the scraper 41 according to the present embodiment, the turning center of the scraper 41 turnably installed in the moving slider 21 is positioned in the inner space 15 (the inside of the space according to the present invention) sandwiched by the wheel upper-side rolling surface 13*a* and the wheel lower-side rolling surface 14*a* when the turning center is viewed from the axial direction. In other words, the positions of the tilting center of the moving slider 21 with respect to the track rail 11 and the turning center of the scraper 41 with respect to the moving slider 21 are in the same or close positions, and hence a smooth operation is realized for the turning operation of the scraper 41.

The scraper 41 of the present embodiment has the arm-like connection portions 41*b* that connect the attachment portion 41*a* and the pressing portions 41*c* to each other, and hence can be easily elastically deformed. In addition, even when the wheel upper-side rolling surface 13*a*, the wheel lower-side rolling surface 14*a*, and the scraper 41 wear out, no gap is generated between the pressing portions 41*c* and each of the wheel upper-side rolling surface 13*a* and the wheel lower-side rolling surface 14*a*, and the function as the scraper 41 can be constantly performed. The scraper 41 of the present embodiment has the arm-like connection portions 41*b*, and hence the pressing portions 41*c* can be brought into contact with the wheel upper-side rolling surface 13*a* and the wheel lower-side rolling surface 14*a* with an appropriate force. In the arm-like connection portions 41*b* of the scraper 41 of the present embodiment, portions that are bending are formed to be narrower than other sections. An effect in which the connection portions 41*b* are easily elastically deformed is obtained by forming the bending portions to be narrow as above. The pressing force of the arm-like connection portions 41*b* becomes weaker when an arm-like shape section is set to be longer. Therefore, for example, when the pressing force with respect to the wheel upper-side rolling surface 13*a* and the wheel lower-side rolling surface 14*a* is desired to be smaller, the arm-like shape section only needs to be set to be longer.

A suitable embodiment of the present invention has been described above, but the technical scope of the present invention is not limited to the scope described in the embodiment described above. Various modifications or improvements can be made in the embodiment described above.

For example, a case where the scraper 41 of the embodiment described above is configured by resin that is an elastic body having an elastic force has been assumed, but the scope of the elastic body according to the present invention is not limited to resin. The scraper of the present invention can be configured by a leaf spring, for example. In other words, any material may be used for the scraper of the present invention as long as the material exhibits an elastic force that presses the pressing portions 41*c* with respect to the wheel upper-side rolling surface 13*a* and the wheel lower-side rolling surface 14*a*.

Figure 8:
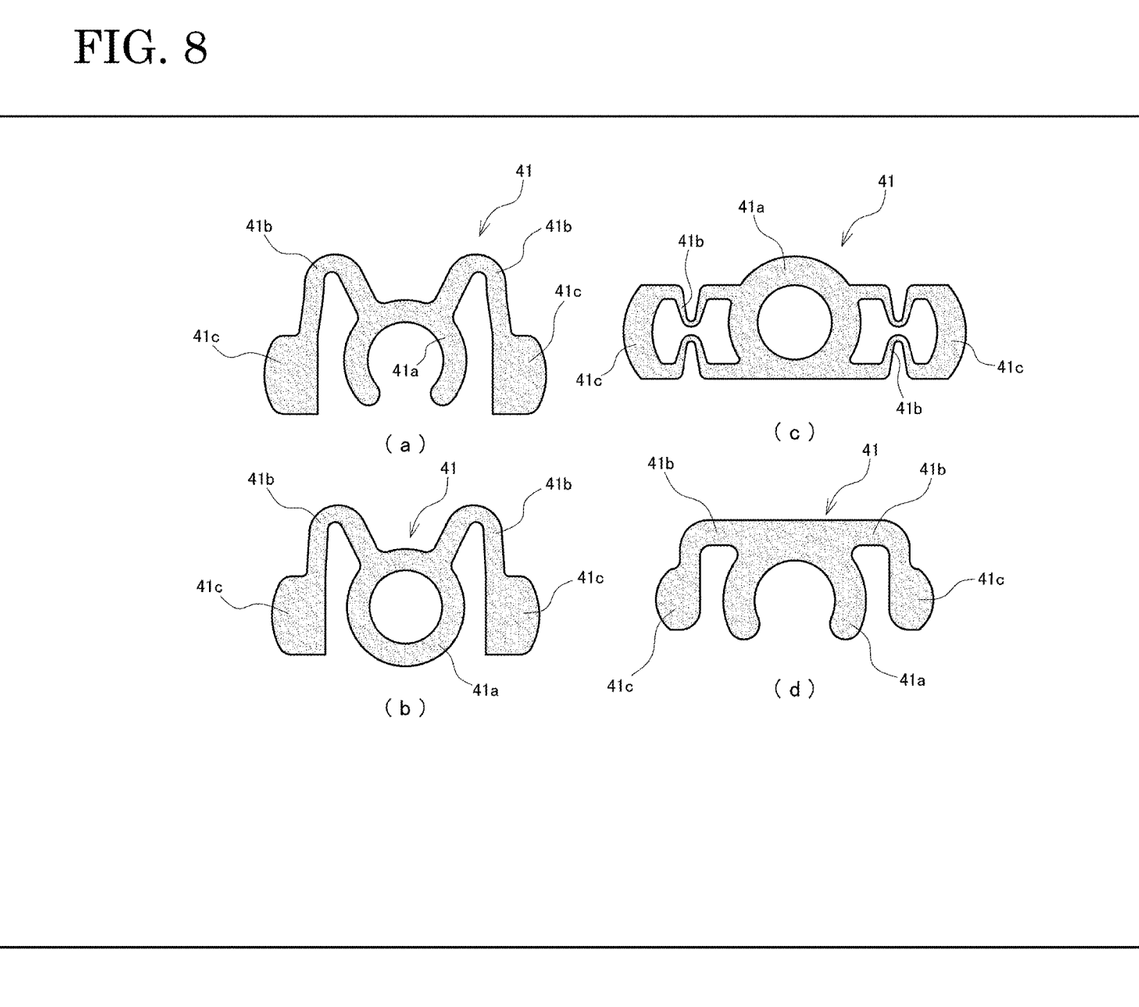
FIG. 8 is a view showing modified examples of various shapes that the scraper of the present invention may have.

For example, the scraper 41 of the embodiment described above is formed such that the appearance shape of the attachment portion 41*a* is a substantially C-like shape and the appearance shape of the entire scraper is a substantially M-like shape. However, the scraper of the present invention is not limited to the shape shown in the embodiment described above. Any shape can be employed as the scraper of the present invention as long as effects similar to those of the embodiment described above can be exhibited. For example, FIG. 8 is shown as modified examples of shapes that the scraper of the present invention may have. FIG. 8 is a view showing the modified examples of various shapes that the scraper of the present invention may have. In FIG. 8, FIG. 8(*a*) shows the scraper 41 of the embodiment described above. Meanwhile, as shown in FIG. 8(*b*) and FIG. 8(*c*) in FIG. 8, the attachment portion of the scraper can be formed such that the appearance shape is a substantially 0-like shape. Regarding the appearance shape of the entire scraper of the present invention, an appearance shape formed in a substantially eight-like shape as that shown in FIG. 8(*c*) in FIG. 8 or an appearance shape formed in a substantially T-like shape as that shown in FIG. 8(*d*) in FIG. 8 may be employed in addition to appearance shapes formed in a substantially M-like shape as those shown in FIG. 8(*a*) and FIG. 8(*b*) in FIG. 8.

It is clear from the description in the claims that forms obtained by adding modifications or improvements as above may also be included in the technical scope of the present invention.

REFERENCE NUMERALS

10 Rolling guide device, 11 Track rail (track member), 12 Attachment surface portion, 12*a* Attachment hole, 13 Upper wall portion (wall portion), 13*a* Wheel upper-side rolling surface (rolling-body rolling surface), 14 Lower wall portion (wall portion), 14*a* Wheel lower-side rolling surface (rolling-body rolling surface), 15 Inner space (inside of space), 21 Moving slider (moving member), 31 Wheel (rolling body), 41 Scraper (elastic body), 41*a* Attachment portion, 41*b* Connection portion, 41*c* Pressing portion, 51 End plate, 52 Greasing nipple, 53 Attachment shaft, 55 Grease supply member, 55*a* Curved surface shape, 55*b* Greasing hole.

The invention claimed is:

1. A rolling guide device, comprising:
 a track member that is an elongated member extending in a longitudinal direction, the track member being formed by:
 an attachment surface portion serving as an attachment reference with respect to an external member; and a pair of wall portions installed upright toward one side from each of both ends of the attachment surface portion;

a moving member installed to be movable in a reciprocal manner along the longitudinal direction of the track member; and a plurality of rolling bodies that guide a relative reciprocal movement of the moving member with respect to the track member by being rollably disposed in a space surrounded by the attachment surface portion and the pair of wall portions forming the track member and between the track member and the moving member, wherein:

a rolling-body rolling surface that comes into contact with a rolling-body outer circumferential surface of each of the rolling bodies is formed in each of wall surfaces of the pair of wall portions facing each other;

a scraper including a pressing portion corresponding to each of the rolling-body rolling surfaces, wherein the scraper is turnably installed in the moving member, and each pressing portion presses corresponding one of the rolling-body rolling surfaces;

the scraper includes at least:
an attachment portion turnably attached to an attachment shaft formed in the moving member; and
a frictional force of each pressing portion with respect to the rolling-body rolling surface is smaller than a frictional force of the attachment portion with respect to the attachment shaft formed in the moving member.

2. The rolling guide device according to claim 1, wherein the scraper is configured by an elastic body.

3. The rolling guide device according to claim 1, wherein a turning center of the scraper turnably installed in the moving member is configured to be positioned in the space when the turning center is viewed from an axial direction.

4. The rolling guide device according to claim 1, wherein a shape of the rolling-body rolling surface and a shape of a section in the pressing portion that comes into contact with the rolling-body rolling surface each have a curved surface shape having a substantially same curvature.

5. The rolling guide device according to claim 1, wherein:
the scraper includes a connection portion that connects the attachment portion and the pressing portion to each other while applying an elastic force between the attachment portion and the pressing portion; and
the elastic force of the connection portion is constantly applied in a direction in which the pressing portion presses the rolling-body rolling surface.

6. The rolling guide device according to claim 5, wherein the attachment portion forms a substantially C shape or a substantially O shape.

7. The rolling guide device according to claim 5, wherein the scraper forms a substantially M shape, a substantially rake shape, or a substantially wrapped-candy shape,
wherein the rake shape is formed by a straight head portion and a plurality of tines extending away from the straight head portion in substantially perpendicular direction, the tines are located on the same side of the straight head portion, and the tines includes the attachment portion and the pressing portion,
wherein the wrapped-candy shape includes a main body portion and a pair of tab portions disposed on both ends of the main body portion, each of the tab portions being connected to the main body portion via a constricted portion, the main body portion includes the attachment portion, and the tab portion includes the pressing portion.

* * * * *